United States Patent
Leo et al.

(10) Patent No.: US 11,909,082 B2
(45) Date of Patent: Feb. 20, 2024

(54) CARBON DIOXIDE PRODUCTION FROM CARBONATE FUEL CELLS

(71) Applicant: FuelCell Energy, Inc., Danbury, CT (US)

(72) Inventors: Anthony Leo, New Milford, CT (US); Stephen Jolly, Middlebury, CT (US); James Kim, Plantsville, CT (US)

(73) Assignee: FuelCell Energy, Inc., Danbury, CT (US)

( * ) Notice: Subject to any disclaimer, the term of this patent is extended or adjusted under 35 U.S.C. 154(b) by 45 days.

(21) Appl. No.: 17/476,176

(22) Filed: Sep. 15, 2021

(65) Prior Publication Data
US 2022/0085397 A1 Mar. 17, 2022

Related U.S. Application Data

(60) Provisional application No. 63/079,284, filed on Sep. 16, 2020.

(51) Int. Cl.
*H01M 8/0668* (2016.01)
*H01M 8/04746* (2016.01)
(Continued)

(52) U.S. Cl.
CPC ..... *H01M 8/0668* (2013.01); *H01M 8/04761* (2013.01); *H01M 8/0637* (2013.01); *H01M 8/145* (2013.01); *H01M 2008/147* (2013.01)

(58) Field of Classification Search
CPC ........... H01M 8/0668; H01M 8/04761; H01M 8/04455; H01M 8/04477; H01M 8/04805;
(Continued)

(56) References Cited

U.S. PATENT DOCUMENTS

2005/0271914 A1* 12/2005 Farooque ............ H01M 8/0637
429/410
2010/0028730 A1* 2/2010 Ghezel-Ayagh ..........................
H01M 8/04014
429/444
(Continued)

FOREIGN PATENT DOCUMENTS

WO  WO-2020/053793  3/2020

OTHER PUBLICATIONS

International Search Report and Written Opinion on PCT/US2021/050521 dated Jan. 4, 2022 (16 pages).

*Primary Examiner* — Matthew W Van Oudenaren
(74) *Attorney, Agent, or Firm* — Foley & Lardner LLP

(57) ABSTRACT

A fuel cell system includes a fuel cell stack having a plurality of fuel cells that each contain a plurality of fuel electrodes and air electrodes. The system includes a fuel receiving unit connected to the fuel cell stack, which receives a hydrocarbon fuel from a fuel supply. The system includes a fuel exhaust processing unit fluidly coupled to the fuel cell stack by a slip stream, where the fuel exhaust processing unit processes fuel exhaust from the fuel cell stack, and the slip stream is fluidly connected to an exhaust stream flowing from the fuel cell stack. The fuel processing unit removes a first portion of carbon dioxide ($CO_2$) from fuel exhaust within the slip stream, outputs the first portion of $CO_2$ in a first stream, and outputs a second portion of $CO_2$ remaining from the fuel exhaust in the slip stream into a second stream, which includes hydrogen.

10 Claims, 7 Drawing Sheets

(51) Int. Cl.
*H01M 8/14* (2006.01)
*H01M 8/0637* (2016.01)

(58) Field of Classification Search
CPC ............... H01M 8/0637; H01M 8/145; H01M 8/04097; H01M 8/04402; H01M 8/04425; H01M 8/04462; H01M 8/04776; H01M 8/0662; H01M 2008/147
See application file for complete search history.

(56) References Cited

U.S. PATENT DOCUMENTS

| | | |
|---|---|---|
| 2011/0223501 A1 | 9/2011 | Uematsu et al. |
| 2014/0260310 A1 | 9/2014 | Berlowitz et al. |
| 2016/0359182 A1* | 12/2016 | Farooque ............ H01M 8/0612 |
| 2017/0040629 A1 | 2/2017 | Farooque et al. |
| 2019/0224641 A1* | 7/2019 | Jahnke ................... B01J 19/245 |

* cited by examiner

CARBON DIOXIDE PRODUCTION FROM CARBONATE FUEL CELLS

CROSS-REFERENCE TO RELATED PATENT APPLICATIONS

This application claims the benefit of and priority to U.S. Patent Application No. 63/079,284, filed Sep. 16, 2020, the entire disclosure of which is hereby incorporated by reference herein.

BACKGROUND

The present disclosure relates generally to the field of extraction of carbon dioxide ($CO_2$) from a carbonate fuel cell and, more particularly, to extraction of $CO_2$ from an internal process stream of the carbonate fuel cell.

Generally, molten carbonate fuel cells produce an internal process stream of gas with high $CO_2$ concentration, which is lowered by downstream processes by $CO_2$ consumption and dilution. Such fuel cells include a fuel receiving anode, an air receiving cathode, and a carbonate electrolyte. During operation of the fuel cell, a hydrocarbon based fuel (e.g., methane) may be fed through an anode-side inlet and undergo reforming within the fuel cell to generate $H_2$ and $CO_2$. The produced $H_2$ may then react with carbonate ions from the contained electrolyte, producing additional CO2. The resulting $CO_2$ containing gas leaving the fuel electrodes may be routed through a cathode-side inlet in combination with an air feed, where the CO2 will be consumed by the air electrode reaction. During such use of a hydrocarbon (e.g., methane) based fuel (e.g., natural gas or biogas), one molecule of $CO_2$ will be exhausted from the fuel cell for every molecule of the hydrocarbon, but as described above, additional $CO_2$ (e.g., an additional four molecules of $CO_2$) may be produced by the anode (i.e., fuel electrode) and subsequently consumed by cathode (i.e., air electrode).

As the exhaust streams, particularly the fuel exhaust stream (i.e., exhaust from the anode), may comprise a surplus of $CO_2$, the excess may be unable or unsuitable for consumption with the fuel cell system and, consequently, may be ultimately exhausted from the fuel cell system entirely. Accordingly, excess $CO_2$ may be expelled from the fuel cell system, which may not only waste potentially usable $CO_2$ but also contribute to excess emissions.

Accordingly, it would be advantageous to provide a fuel cell system that incorporates an internal mechanism to extract $CO_2$ from $CO_2$ rich fuel exhaust for recycling, processing, or other reuse to reduce waste and emissions.

SUMMARY

An aspect of the present disclosure relates to a fuel cell system. The system includes a fuel cell stack having a plurality of fuel cells, the plurality of fuel cell containing a plurality of fuel electrodes and air electrodes. The system further includes a fuel receiving unit fluidly coupled to the fuel cell stack, the fuel receiving unit configured to receive a hydrocarbon fuel from a fuel supply. The system also includes a fuel exhaust processing unit fluidly coupled to the fuel cell stack by a slip stream, the fuel exhaust processing unit configured to process fuel exhaust from the fuel cell stack, and the slip stream being fluidly connected to an exhaust stream flowing from the fuel cell stack. The fuel processing unit is configured to remove a first portion of carbon dioxide ($CO_2$) from fuel exhaust within the slip stream and output the first portion of $CO_2$ in a first stream, and wherein a second portion of $CO_2$ remaining from the fuel exhaust in the slip stream is output into a second stream, the second stream including hydrogen.

In various embodiments, an amount of $CO_2$ in the first portion is controlled by a controller in communication with the fuel cell system. In some embodiments, the amount of $CO_2$ in the first portion is predetermined based on an operational state of the fuel cell system. In other embodiments, the amount of $CO_2$ in the first portion is adjusted in real time responsive to a $CO_2$ demand. In yet other embodiments, a first fluid pathway is connected to the exhaust stream, the first fluid pathway flowing to an air combination unit, wherein fuel exhaust from the first fluid pathway is mixed with ambient air within the air combination unit. In various embodiments, a mixture of fuel exhaust mixed within the air combination unit is supplied to the plurality of air electrodes via a second fluid pathway. In some embodiments, wherein the air combination unit comprises a heater, the heater configured to react hydrogen within the mixture. In other embodiments, the carbon processing unit includes an exhaust cooling component and a $CO_2$ separation component, wherein the exhaust cooling component is configured to cool fuel exhaust from the slip stream and extract water from the fuel exhaust.

In yet other embodiments, the fuel exhaust processing unit further includes a carbon processing unit, the carbon processing unit configured to remove the first portion of $CO_2$ in liquid form. In some embodiments, the first portion of $CO_2$ is exported from the fuel cell system via a plurality of outlet pathways, each of the plurality of outlet pathways being fluidly connected to the carbon processing unit. In various embodiments, each of the plurality of outlet pathways corresponds to a predetermined use associated with the first portion of $CO_2$. In some embodiments, a flow of the fuel exhaust in the slip stream is controlled by at least one of a fan or blower. In other embodiments, the flow is controlled based on at least one of an operational mode of the fuel cell system or a demand of $CO_2$.

Another aspect of the present disclosure relates to a method of extracting carbon dioxide. The method includes receiving, by a fuel exhaust processing unit, a portion of fuel exhaust, wherein the portion of fuel exhaust flows from a slip stream connected to an exhaust stream flowing from a fuel cell stack. The method also includes controlling, by at least one of a fan or blower, a flow of the fuel exhaust within the slip stream. The method further includes removing, by the fuel exhaust processing unit, a first portion of carbon dioxide ($CO_2$) from fuel exhaust within the slip stream. The method also includes outputting, by the fuel exhaust processing unit, the first portion of $CO_2$ in a first stream and a second portion of $CO_2$ in a second stream, the second portion comprising $CO_2$ remaining after the first portion is removed. The fuel cell stack includes a plurality of fuel cells, the plurality of fuel cell containing a plurality of fuel electrodes and air electrodes.

In various embodiments, the method further includes exporting, by the fuel exhaust processing unit, the first portion of $CO_2$.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1:
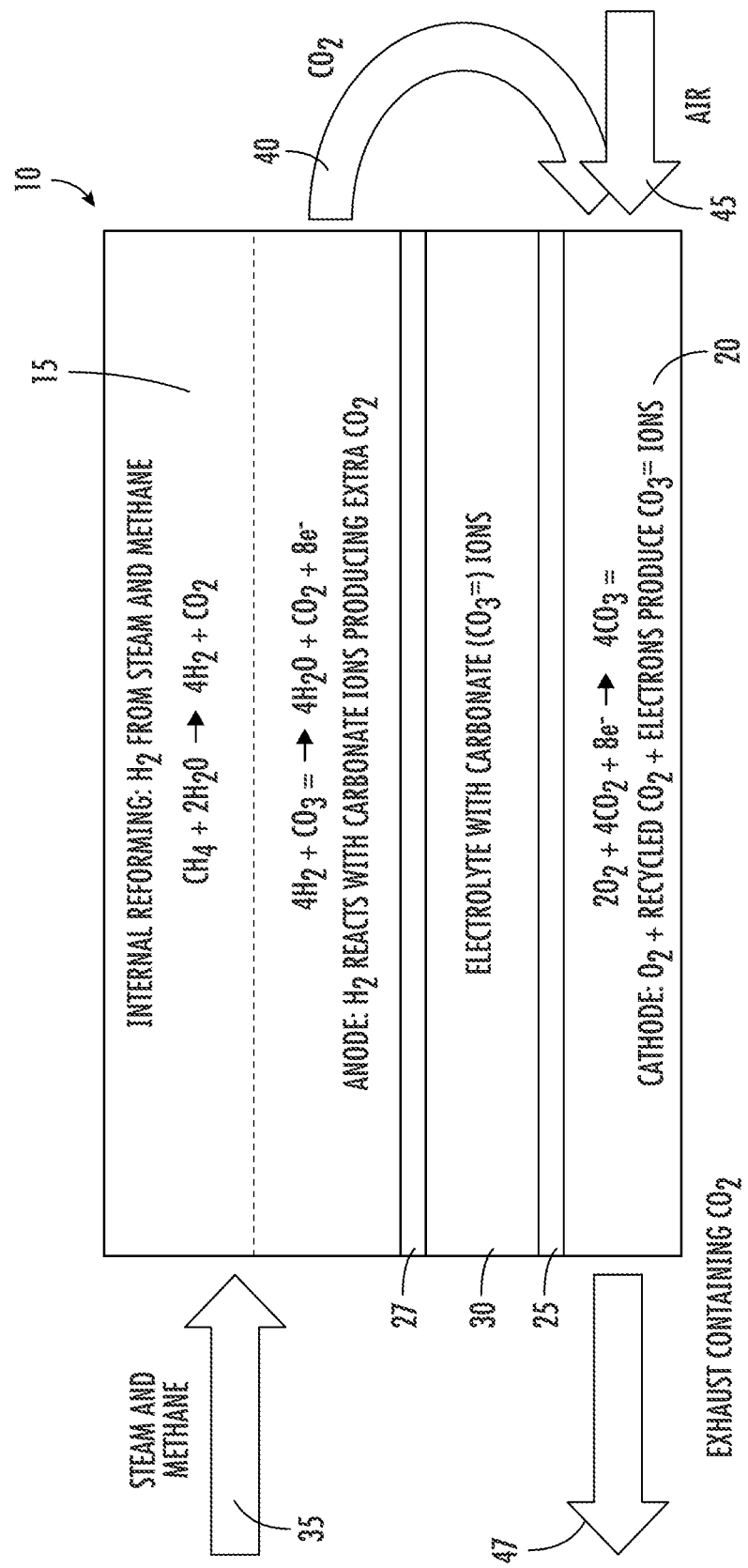
FIG. 1 is a schematic representation of a carbonate fuel cell, according to an exemplary embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

One embodiment of the disclosure relates to a fuel cell system having a molten carbonate fuel cell fluidly coupled to a fuel supply, an air supply, and a variable load. The fuel cell may be configured to receive fuel at a fuel electrode (e.g., anode) from the fuel supply and receive air at an air electrode (e.g., cathode) from the air supply. The fuel cell system may further include an exhaust processing portion, which may be fluidly coupled to a carbon processing unit. The carbon processing unit may be configured to receive at least a portion of fuel exhaust from an outlet from the fuel electrode, wherein the carbon processing unit may extract carbon and/or carbon dioxide ($CO_2$) from the received fuel exhaust for later reuse, recycling, collection, or removal from the fuel cell system.

In various embodiments, the exhaust processing portion may include one or more fluid pathways (e.g., slip streams) connected to the fuel exhaust, through which $CO_2$ rich fuel exhaust may flow for downstream reuse, recycling, collection, or removal. In various embodiments, the exhaust processing portion may include a circulation device (e.g., fan, blower, etc.) to facilitate flow of one or more portions of fuel exhaust through the corresponding one or more fluid pathways (e.g., slip streams). In various embodiments, an amount of fuel exhaust (and thus, an amount of $CO_2$) directed into the one or more fluid pathways may be controlled by the circulation device (e.g., fan, blower, etc.). In various embodiments, a number of fluid pathways may be controlled by one or more controllable vents and/or valves. In various embodiments, an amount of fuel exhaust directed to the one or more fluid pathways and/or a number of the one or more fluid pathways may be predetermined based on an operational mode of the fuel cell system (e.g., high efficiency, low emission, power maximization, etc.). In various embodiments, an amount of fuel exhaust directed to the one or more fluid pathways and/or a number of the one or more fluid pathways may be predetermined based on a predetermined application need (e.g., extraction for use in food products, extraction for future chemical reagent use, etc.).

In various embodiments, the carbon processing unit may be configured to controllably remove an amount of $CO_2$ from the received fuel exhaust. In various embodiments, the carbon processing unit may be configured to remove an amount of $CO_2$ based on a predetermined application need (e.g., extraction for use in food products, extraction for future chemical reagent use, etc.). In various embodiments, the carbon processing unit may include one or more filters, cooling and/or condensing devices, membranes, etc. to facilitate separation of $CO_2$ from the received one or more portions of the fuel exhaust.

In various embodiments, the fuel cell system may be operably coupled to a controller, which may control operations of the fuel cell and fluidly coupled components. In various embodiments, the controller may control operation of the fuel exhaust processing portion, the carbon processing unit, and/or the circulation device. In various embodiments, the controller may be configured to cause the fuel cell system to operate in one or more predetermined modes, wherein an amount of fuel exhaust and/or an amount of extracted $CO_2$ or carbon is based on the one or more predetermined modes. In various embodiments, the one or more predetermined modes may include, but are not limited to, a maximum efficiency mode, a maximum power mode, and a minimum emissions mode.

Referring generally to the figures, a $CO_2$ producing fuel cell system having a carbonate fuel cell may be fluidly coupled to a fuel supply, an air supply, and a variable load, according to various exemplary embodiments. The carbonate fuel cell may be configured to receive fuel at a fuel electrode (e.g., anode) from the fuel supply and receive air at an air electrode (e.g., cathode) from the air supply. In various embodiments, the fuel cell system may further include an exhaust processing portion fluidly coupled to a carbon processing unit. The carbon processing unit may be configured to receive at least a portion of fuel exhaust, via the exhaust processing portion, from an outlet from the fuel electrode, wherein the carbon processing unit may extract carbon and/or carbon dioxide ($CO_2$) from the received fuel exhaust for later reuse, recycling, collection, or removal from the fuel cell system (hereinafter "processing").

In various embodiments, the exhaust processing portion may include one or more fluid pathways (e.g., slip streams) connected to the fuel exhaust, through which $CO_2$ rich fuel exhaust may flow for downstream processing. In various embodiments, the exhaust processing portion may include a circulation device (e.g., fan, blower, etc.) to facilitate flow of one or more portions of fuel exhaust through the corresponding one or more fluid pathways (e.g., slip streams). In various embodiments, the circulation device may be configured to control an amount of fuel exhaust (and thus, an amount of $CO_2$) directed into the one or more fluid pathways. In various embodiments, the fuel exhaust processing portion may include one or more vents and/or valves, which may control an amount of fuel exhaust directed to the one or more fluid pathways. In various embodiments, the one or more vents and/or valves may determine a number of fluid pathways present within the exhaust processing portion.

In various embodiments, an amount of fuel exhaust directed to the one or more fluid pathways and/or a number of the one or more fluid pathways within the exhaust processing portion may be predetermined based on an operational mode of the fuel cell system (e.g., high efficiency, low emission, power maximization, etc.). In various embodiments, an amount of fuel exhaust directed to the one or more fluid pathways and/or a number of the one or more fluid pathways in the exhaust processing portion may be predetermined based on a predetermined application need (e.g., extraction for use in food products, extraction for future chemical reagent use, etc.). In various embodiments, the operational mode of the fuel cell system may be based on the predetermined application need.

In various embodiments, the carbon processing unit may be configured to controllably remove an amount of $CO_2$ from the received fuel exhaust. In various embodiments, the carbon processing unit may be configured to remove an amount of $CO_2$ based on a predetermined application need (e.g., extraction for use in food products, extraction for future chemical reagent use, etc.). In various embodiments, the carbon processing unit may include one or more filters, cooling and/or condensing devices, membranes, etc. to facilitate separation of $CO_2$ from the received one or more portions of the fuel exhaust. In various embodiments, the amount of removed $CO_2$ may be based on a type of fuel supplied to the fuel cell system. In various embodiments, the amount of removed $CO_2$ may be based on an amount of fuel supplied to the fuel cell system.

In various embodiments, the fuel cell system may be operably coupled to a controller, which may control operations of the fuel cell and fluidly coupled components. In various embodiments, the controller may control operations of the fuel cell system, which include but is not limited to, the fuel exhaust processing portion, the carbon processing unit, and/or the circulation device. In various embodiments, the controller may be configured to cause the fuel cell system to operate in one or more predetermined modes, wherein an amount of fuel exhaust and/or an amount of extracted $CO_2$ or carbon is based on the one or more predetermined modes. In various embodiments, the one or more predetermined modes may include, but are not limited to, a maximum efficiency mode, a maximum power mode, and a minimum emissions mode. In various embodiments, the controller may control an amount of fuel supplied to the fuel cell system and thereby control an amount of $CO_2$ extracted from the fuel exhaust.

Turning now to the figures and referring specifically to FIG. 1, a schematic representation of a carbonate fuel cell 10 for a $CO_2$ producing fuel cell system 100 is shown, according to an exemplary embodiment. As shown, fuel cell 10 includes an anode-side fuel passageway 15 adjacent to an anode 27 and a cathode-side air passageway 20 adjacent to a cathode 25, where the anode 27 and the cathode 25 are separated by an electrolyte 30 having carbonate ions. A hydrocarbon fuel 35, such as methane, may be supplied to the anode-side fuel passageway 15, wherein the fuel 35 undergoes reforming to produce $H_2$ and $CO_2$. The produced $H_2$ may subsequently react with carbonate ions at the surface of the anode 15 to produce water and additional $CO_2$. As shown, the fuel exhaust 40 from the anode-side fuel passageway 15, which includes the produced $CO_2$, may be directed to an inlet on the cathode-side air passageway 20. The fuel exhaust 40 may be combined with ambient air 45, which is also supplied at the inlet to the cathode-side air passageway 20. Within the cathode-side air passageway 20, $CO_2$ and $O_2$ from the fuel exhaust and ambient air, respectively, may react at the surface of the cathode 25 to form carbonate ions. Excess $CO_2$ at the cathode 25 is subsequently directed out of the fuel cell 10 via an exhaust stream 47, wherein the exhaust stream 47 may be directed to further processing or may be released.

Figure 2:
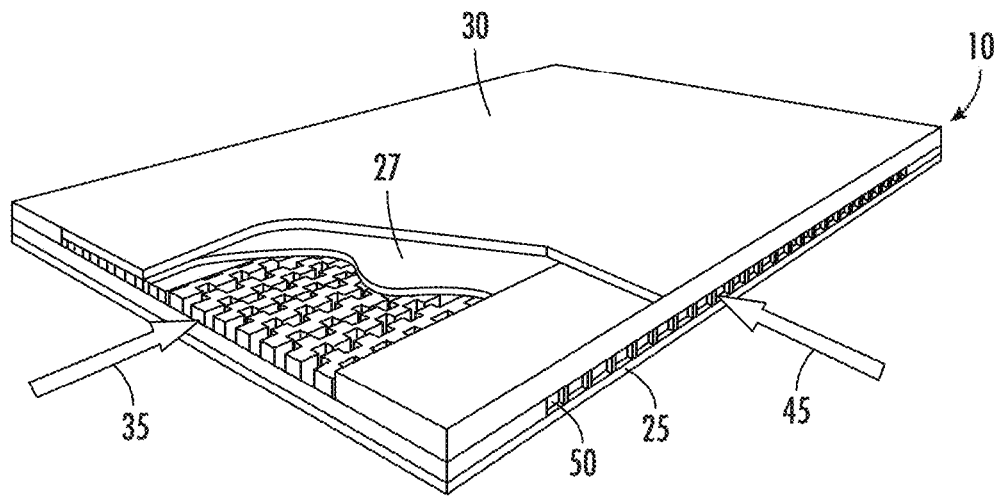
FIG. 2 is a perspective view of a carbonate fuel cell, according to an exemplary embodiment.
Figure 3:
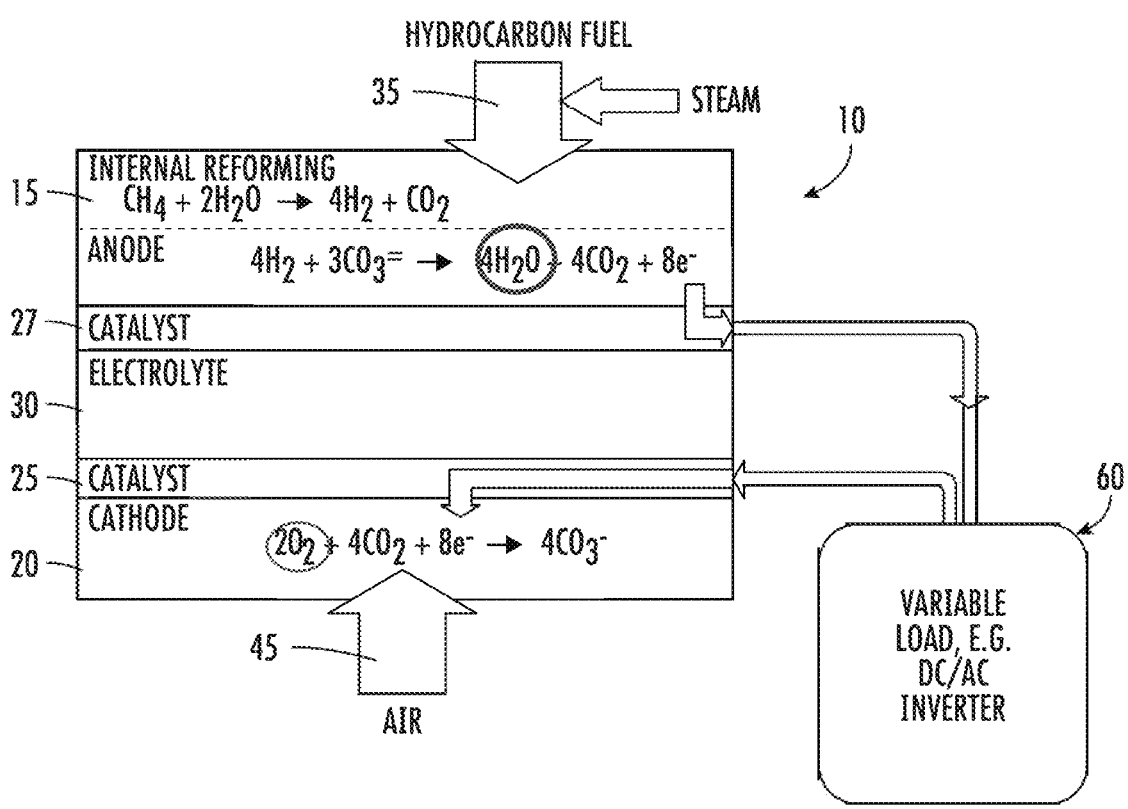
FIG. 3 is a schematic representation of a carbonate fuel cell, according to an exemplary embodiment.

FIG. 2 shows a perspective view of the fuel cell 10, according to an exemplary embodiment. As shown, hydrocarbon fuel 35 may be supplied to anode 27 (e.g., via anode-side fuel passageway 15) and ambient air 45 may be supplied to the cathode 25 (e.g., via cathode-side air passageway 20). As illustrated, electrolyte 30 may be distributed within the fuel cell 10 to enable ion transfer and exchange. During use, multiple fuel cells 10 may be assembled to form a fuel cell stack. Accordingly, the fuel cell 10 may also include a bipolar plate 50, which may prevent mixing of fuel 35 and ambient air 45 within the fuel cell 10 and conduct current among each of the fuel cells 10 within a stack. Accordingly, electrons generated by the fuel cell 10 during electrochemical reactions at the anode 27 may be provided as current to a variable load 60, which may be coupled to the fuel cell 10 or a stack containing multiple fuel cells 10, as illustrated in FIG. 3.

Figure 4:
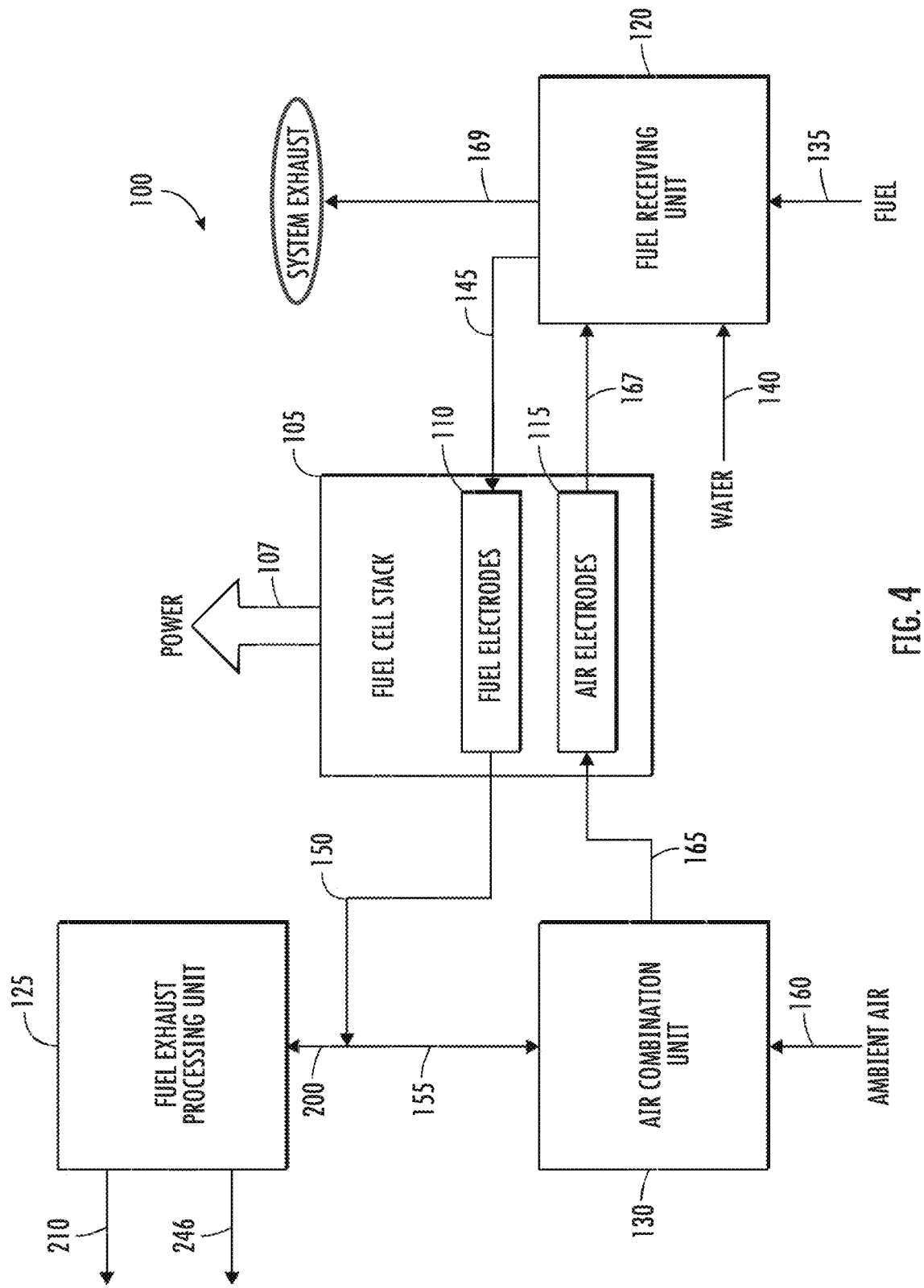
FIG. 4 is a schematic representation of a carbon-processing carbonate fuel cell system, according to an exemplary embodiment.

FIG. 4 shows a schematic representation of a $CO_2$ producing fuel cell system 100, according to an exemplary embodiment. As shown, the fuel cell system 100 may be configured to provide power 107 to one or more variable loads (e.g., similar or equivalent to variable load 60). The fuel cell system 100 includes a fuel cell stack 105, which contains multiple fuel electrodes 110 (e.g., anodes) and air electrodes 115 (e.g., cathodes) contained within multiple fuel cells (e.g., each similar or equivalent to fuel cell 10). The fuel cell stack 105 may be fluidly coupled to a fuel receiving unit 120, a fuel exhaust processing unit 125, and an air combination unit 130.

The fuel receiving unit 120 may be configured to receive a hydrocarbon fuel via the fuel supply 135 to provide to the fuel cell stack 105. In various embodiments, the fuel from the fuel supply 135 may be natural gas or other hydrocarbon fuels such as biogas. The received fuel may be humidified by water from a water supply 140 and directed to the fuel electrodes 110 via the fuel pathway 145. Fuel provided through the fuel pathway 145 may undergo electrochemical reactions at the surfaces of the fuel electrodes 110 to form $CO_2$, water, and energy (in the form of electrons). The generated energy may then be supplied over time as power 107 to a coupled variable load (e.g., similar or equivalent to variable load 60).

The produced $CO_2$ and water may be directed away from the fuel electrodes 110, via a slip stream 200 from the fuel exhaust stream 150, to the fuel exhaust processing unit 125. In various embodiments, the fuel exhaust processing unit 125 may include one or more components to process the received fuel exhaust to facilitate cooling, condensing, drying, and/or removing $CO_2$. In various embodiments, removed $CO_2$ may be routed through stream 210. In various embodiments, an amount of extracted $CO_2$ may be controlled (e.g., by a controller in communication with the fuel cell system 100) based on or more use applications. In various embodiments, the amount may be adjusted in real-time to accommodate a $CO_2$ demand. In other embodiments, the amount may be predetermined based on a mode or set operational state of the fuel cell system 100. Residual gas from the extracted slip stream 200 consisting of mostly hydrogen and any non-removed $CO_2$ may be routed through the stream 246 for later use, which may include, but is not limited to, beneficial use of the hydrogen—such as sale as an industrial gas, use as fuel for low-temperature fuel cell-powered transportation vehicles or other equipment, and/or recycling back to the fuel exhaust stream 150. Fuel exhaust not extracted to the stream 200 may then be directed through the fluid pathway 155 (which is fluidly connected to the exhaust stream 150) to the air combination unit 130, wherein the processed fuel exhaust may be mixed with ambient air from the air supply 160 and supplied to the air electrodes 115 via the fluid pathway 165. Oxygen and $CO_2$ from the processed exhaust and the air may then undergo electrochemical reactions at the surfaces of the air electrodes 115 to form carbonate ions. Remaining $CO_2$ from the air electrodes 115 may be exhausted through the air exhaust 167 and directed to the fuel receiving unit 120 to provide heat for fuel humidification, where $CO_2$ from the air exhaust 167 may be recycled through the fluid pathway 145 and/or removed from the fuel cell system 100 via the system exhaust 169.

Figure 5:
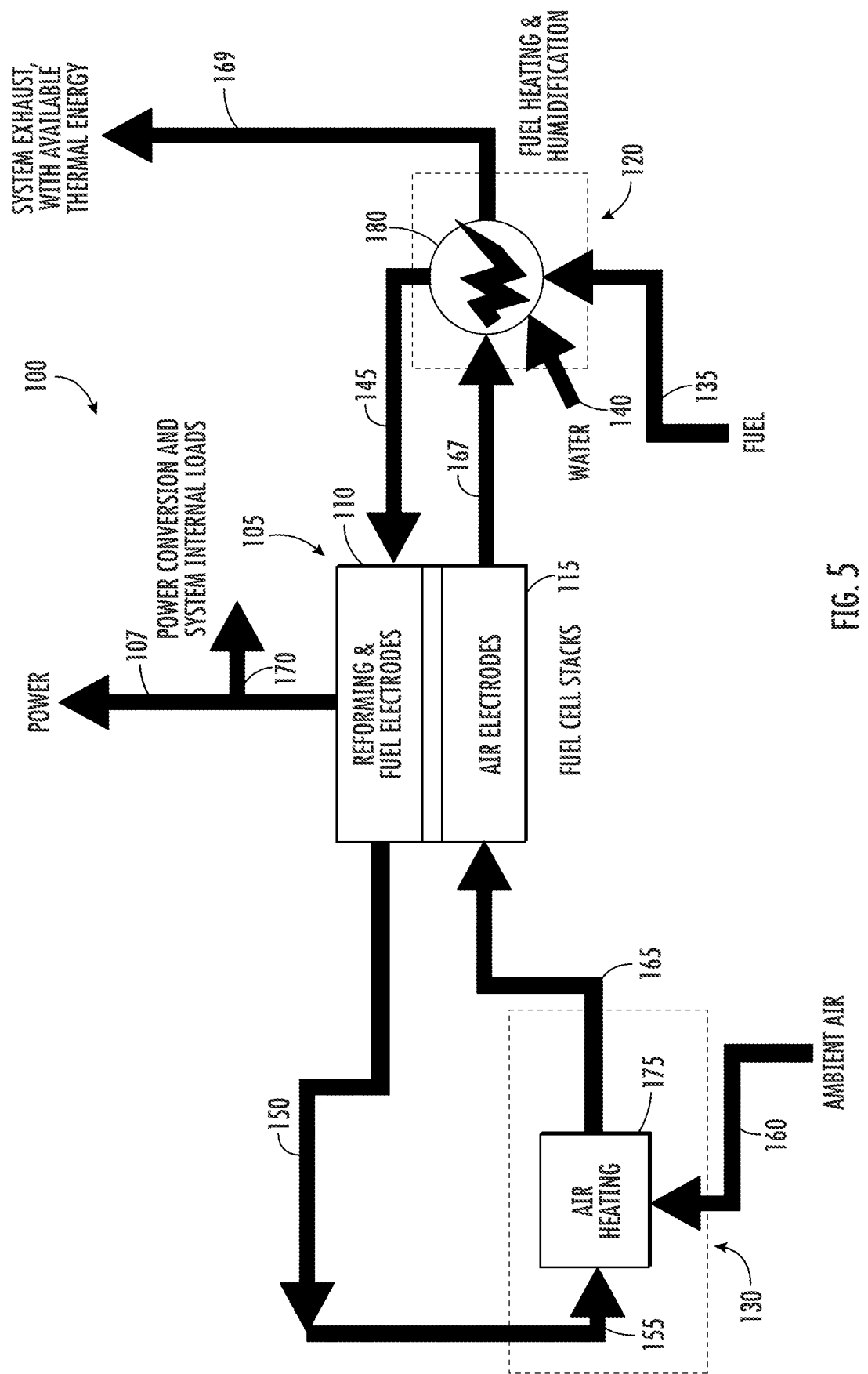
FIG. 5 is a schematic representation of a carbonate fuel cell system, according to an exemplary embodiment.

FIG. 5 shows a schematic representation of the fuel cell system 100, which is not configured for $CO_2$ export, according to another embodiment. As shown, fuel may be provided to the fuel electrodes 110 from the fuel supply 135 via fluid pathway and fuel receiving unit 120. In various embodiments, the fuel receiving unit 120 may include one or more heaters 180 to facilitate heating and/or humidifying fuel received from the fuel supply 135 and/or the air exhaust 167 (e.g., using water received from water supply 140). Accordingly, fuel supplied to the fuel electrodes 110 may undergo electrochemical reactions to generate energy that may be provided over time through power output 107 to a variable load. As shown, generated energy may additionally be supplied via a secondary power output 170 to one or more power conversion and/or internal system loads such as, but not limited to, a bidirectional power inverter, a coupled energy storage system, etc.

The fuel exhaust stream 150 containing $CO_2$ may flow directly from the fuel electrodes 110 to the air combination unit 130. Finally, as shown in FIG. 5, the air combination unit 130 may include a heater 175, which may be configured react residual hydrogen in fuel exhaust from the fluid pathway 155 with air received from the ambient air supply 160 to produce heat such that a heated combination of reacted fuel exhaust and air may be circulated to the air electrodes 115 via the fluid pathway 165.

Figure 6:
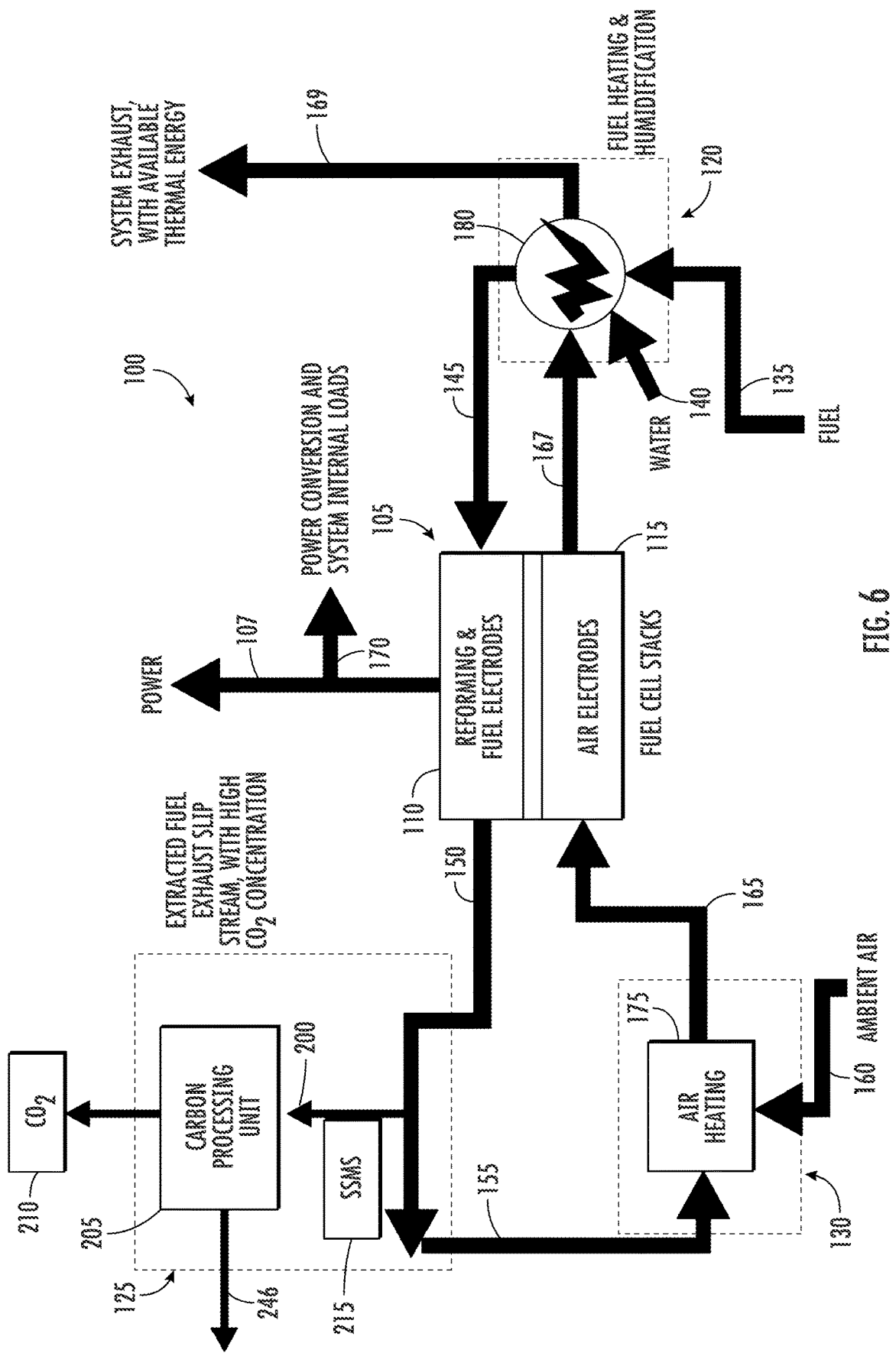
FIG. 6 is a schematic representation of a carbon-processing carbonate fuel cell system, according to an exemplary embodiment.

FIG. 6 shows a schematic representation of a $CO_2$ producing fuel cell system 100, according to yet another embodiment. As shown, the fuel exhaust stream 150 may be split within the fuel exhaust processing unit 125 such that a slip stream 200 may carry a portion of the fuel exhaust stream 150 to a carbon processing unit 205 (i.e., included in the fuel exhaust processing unit 125). The slip stream 200, which includes a high $CO_2$ concentration due to $CO_2$ production during electrochemical reactions at the fuel electrodes 110, may pass through the carbon processing unit 205, wherein $CO_2$ may be extracted in gaseous or liquid form and directed away from the fuel cell system through $CO_2$ outlet 210 for later processing. In various embodiments, flow through the slip stream 200 may be metered by a slip stream management system 215, which may include one or more circulation devices including, but not limited to, a blower and a fan. The slip stream management system 215 may be controlled by one or more controllers in communication with the fuel cell system 100. In some embodiments, flow of fuel exhaust through the slip stream 200 is based on or more use applications. In various embodiments, the flow may be adjusted in real-time to accommodate a CO2 demand. In other embodiments, the flow may be predetermined based on a mode or set operational state of the fuel cell system 100. In various embodiments, the carbon processing unit 205 may include one or more filters, membranes, cooling devices, and/or condensing devices configured to extract $CO_2$ from the fuel exhaust slip stream 200. Typical techniques for extracting $CO_2$ (e.g., from slip stream 200) may include, but are not limited to, compression and cooling of the gas in the slip stream 200 to extract $CO_2$ via a liquid, solid and/or liquid materials, which may absorb $CO_2$ and may be regenerated by heating. Alternatively or in addition, membranes which selectively allow $CO_2$ to pass (but not other constituents) may be implemented (e.g., within the slip stream 200 and/or the carbon processing unit 205). In various embodiments, an amount of extracted $CO_2$ may be controlled based on or more use applications. After extraction of the $CO_2$, residual gas from the slip stream 200 may contain mostly hydrogen plus any unextracted $CO_2$. Gas within the stream 246 may be exported for beneficial use of the hydrogen—such as sale as an industrial gas, use as a fuel for low temperature fuel cell-powered transportation vehicles or other equipment, and/or recycling back to process in the stream 155. Finally, as shown in FIG. 6, the air combination unit 130 may include a heater 175, which may be configured to react residual hydrogen in fuel exhaust from fluid pathway 155 with air received from the ambient air supply 160 to produce heat such that a heated combination of reacted fuel exhaust and air may be circulated to the air electrodes 115 via the fluid pathway 165.

Figure 7:
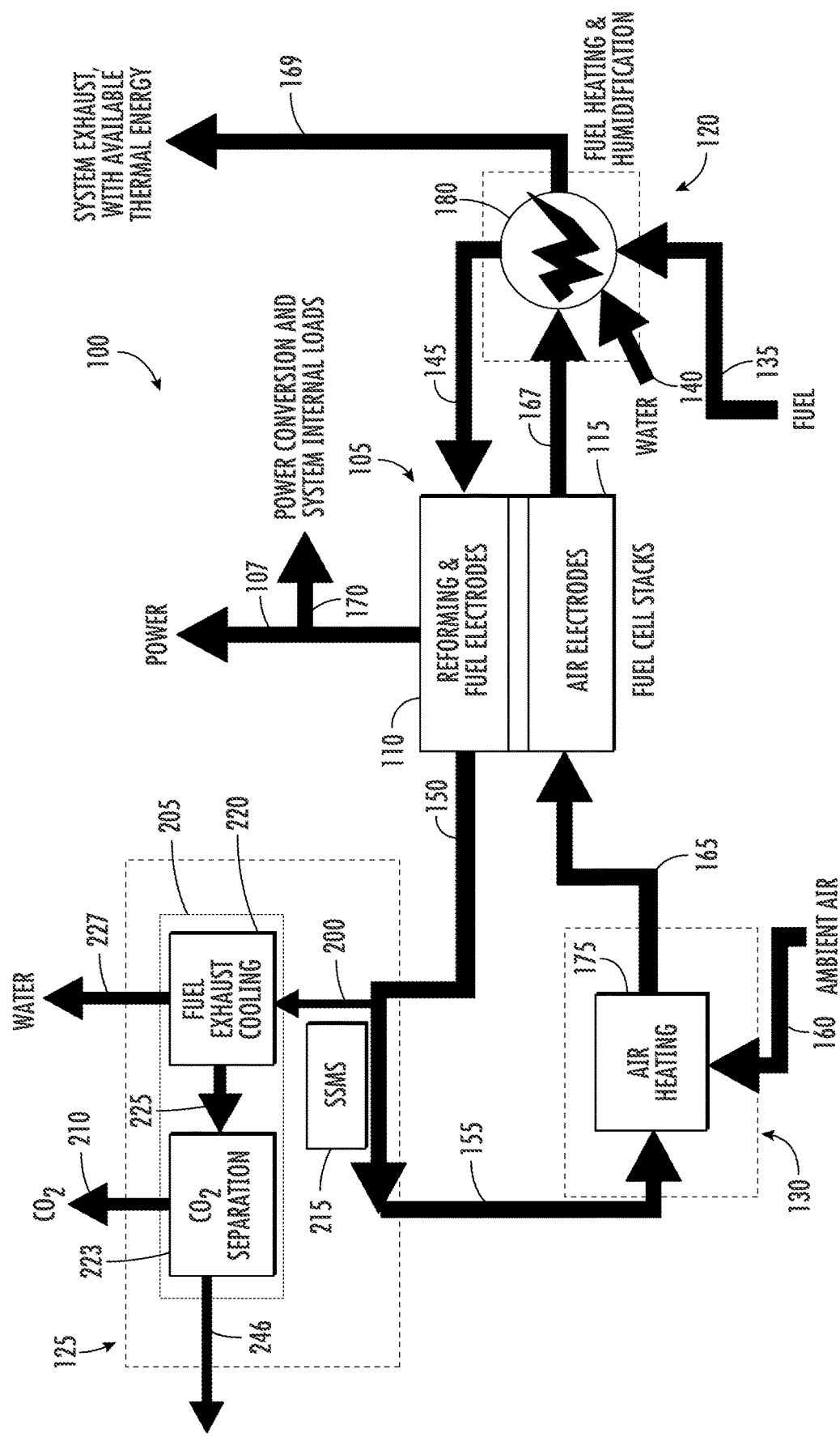
FIG. 7 is a schematic representation of a carbon-processing carbonate fuel cell system, according to an exemplary embodiment.

FIG. 7 shows a schematic representation of a $CO_2$ producing fuel cell system, according to an exemplary embodiment. As shown, the carbon processing unit 205 may include a fuel exhaust cooling component 220 and a $CO_2$ separation component 223. In various embodiments, the exhaust cooling component 220 may be configured to cool fuel exhaust from the slip stream 200 to collect and remove water, where the extracted water may be directed away from the slip stream 200 via the water pathway 227. In various embodiments, water within the water pathway 227 may be recycled and reused within the fuel cell system 100 (e.g., such as through the water supply 140). In various embodiments, water within the water pathway 227 may be directed away and removed from the fuel cell system 100 to provide water as a useful product stream—such as use in a nearby facility to reduce water consumption. Exhaust from the slip stream 200 that has passed through the fuel exhaust cooling component 220 may flow through the fluid pathway 225 to the $CO_2$ separation component 223 (which may include one or more condensers), where $CO_2$ may be controllably extracted from the exhaust via the $CO_2$ outlet 210 and exported from the fuel cell system 100 as a useful product stream—such as use in a nearby facility to reduce water consumption. In various embodiments, an amount of extracted $CO_2$ may be controlled based on or more use applications. After extraction of $CO_2$, residual gas from the slip stream 200 may contain mostly hydrogen plus any unextracted $CO_2$. Gas within the stream 246 may be exported for beneficial use of the hydrogen, which may include, but is not limited to, sale as an industrial gas, use as a fuel for low temperature fuel cell-powered transportation vehicles or other equipment, and/or recycling back to the process in the stream 155.

Figure 8:
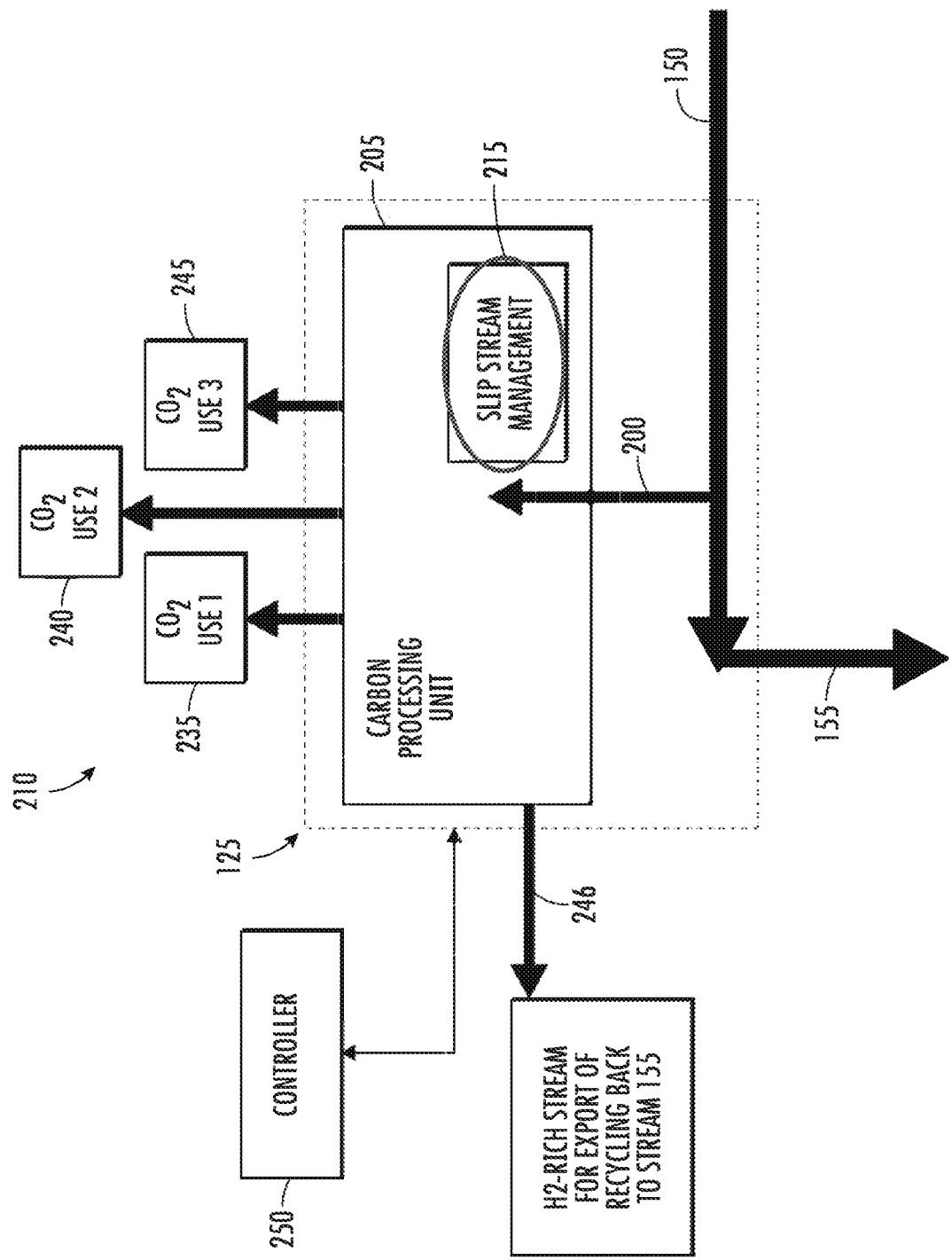
FIG. 8 is a schematic representation of a carbon-processing unit for a carbonate fuel cell system, according to an exemplary embodiment.

FIG. 8 shows a schematic representation of the fuel exhaust processing unit 125, according to an exemplary embodiment. As shown, the carbon processing unit 205 within the fuel exhaust processing unit 125 may receive fuel exhaust through the slip stream 200. After the fuel exhaust is processed within the carbon processing unit 205, extracted $CO_2$ may be exported from the fuel cell system 100 via a plurality of the $CO_2$ outlets 210 fluidly connected to the carbon processing unit 205. As shown, the $CO_2$ outlets 210 may include multiple pathways 235, 240, and 245, wherein each pathway may be directed to a particular or predetermined use application related to the extracted $CO_2$. In various embodiments, use applications related to extracted $CO_2$ may include, but are not limited to, food related applications, medical related applications, fire prevention applications, and chemical reagent applications. In various embodiments, export of $CO_2$ through the pathways 235, 240, and/or 245 may be controlled or determined by one or more vents and/or valve disposed within the carbon processing unit.

In various embodiments, the fuel extraction unit 125 and the carbon processing unit 205 may be operably coupled to a controller 250, which may be configured to control processing of fuel exhaust within the slip stream 200. In various embodiments, the controller 250 may control an amount of fuel exhaust within the slip stream 200. In various embodiments, the amount of fuel exhaust within the slip stream 200 may range from approximately 0% to approximately 40% of the fuel exhaust within the a fuel exhaust stream 150. In various embodiments, an amount of $CO_2$ extracted from the slip stream 200 may be controlled by the controller 250. In various embodiments, the amount of $CO_2$ extracted from the slip stream 200 may range from approximately 0% to approximately 95% of the $CO_2$ in the slip stream 200. In various embodiments, a number of $CO_2$ outlets 210 may be determined and controlled by the controller 250.

In various embodiments, the fuel cell system 100 may be configured to operate in a plurality of predefined modes, wherein the predefined modes may be determined by the controller 250. In various embodiments, the predefined modes may include, but are not limited to, a high efficiency mode, a high power mode, a low emissions mode, and a use application mode. In various embodiments, the predefined modes may be determined and/or selected by a user or operator of the controller 250. In various embodiments, an amount of fuel exhaust in the slip stream 200 may be determined based on the predefined modes. In various embodiments, the amount of $CO_2$ extracted for export from the slip stream 200 may be based on the predefined modes. In various embodiments, export of $CO_2$ through pathways 235, 240, and 245 may be based on the predefined modes.

Although FIGS. 6-8 show the fuel cell system 100 having a single slip stream 200, various embodiments of fuel cell system 100 may include any number of slip streams 200. In various embodiments, the fuel exhaust processing unit 125 may be configured to process additional compounds from within the slip stream 200 (e.g., $H_2$, $H_2O$, etc.).

Notwithstanding the embodiments described above in FIGS. 1-8, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. A fuel cell system comprising:
    a fuel cell stack comprising a plurality of fuel cells, each of the plurality of fuel cells comprising a fuel electrode and an air electrode;
    a fuel receiving unit fluidly coupled to the fuel cell stack, the fuel receiving unit configured to receive a hydrocarbon fuel from a fuel supply and provide the hydrocarbon fuel to the fuel electrodes of the fuel cell stack; and
    a first fluid pathway configured to receive fuel exhaust from the fuel electrodes of the fuel cell stack;
    a second fluid pathway configured to receive a first portion of the fuel exhaust from the first fluid pathway;
    a third fluid pathway configured to receive a second portion of the fuel exhaust from the first fluid pathway;
    a carbon processing unit configured to receive the first portion of the fuel exhaust from the second fluid pathway, and
    to remove a first portion of carbon dioxide ($CO_2$) from the first portion of the fuel exhaust, output the first portion of $CO_2$ in a first stream, and output a remainder of the first portion of the fuel exhaust containing a second portion of $CO_2$ and hydrogen; and
    an air combination unit configured to receive the second portion of the fuel exhaust from the third fluid pathway, to combine the second portion of the fuel exhaust with air, and provide a mixture of the second portion of the fuel exhaust and the air to the air electrodes of the fuel cell stack.

2. The fuel cell system of claim 1, further comprising a controller in communication with the fuel cell system for controlling an amount of the first portion of the fuel exhaust that is provided to the carbon processing unit.

3. The fuel cell system of claim 2, wherein the controller is configured to control the amount of the first portion of the fuel exhaust that is provided to the carbon processing unit based on an operational state of the fuel cell system.

4. The fuel cell system of claim 2, wherein the controller is configured to control the amount of the first portion of the fuel exhaust that is provided to the carbon processing unit in real time responsive to a $CO_2$ demand.

5. The fuel cell system of claim 1, wherein the air combination unit comprises a heater that is configured to react hydrogen within the mixture.

6. The fuel cell system of claim 5, wherein the carbon processing unit includes an exhaust cooling component and a $CO_2$ separation component, wherein the exhaust cooling component is configured to cool the first portion of the fuel exhaust and to extract water from the first portion of the fuel exhaust.

7. The fuel cell system of claim 1, further comprising a plurality of outlet pathways for exporting the first portion of $CO_2$ from the fuel cell system, each of the plurality of outlet pathways being fluidly connected to the carbon processing unit.

8. The fuel cell system of claim 7, wherein each of the plurality of outlet pathways corresponds to a predetermined use associated with the first portion of $CO_2$.

9. The fuel cell system of claim 2, further comprising a fan or blower, wherein the controller is configured to control the fan or blower to control the amount of the first portion of the fuel exhaust that is provided to the carbon processing unit.

10. The fuel cell system of claim 3, further comprising a fan or blower, wherein the controller is configured to control the amount of the first portion of the fuel exhaust that is provided to the carbon processing unit.

* * * * *